United States Patent Office 2,786,035
Patented Mar. 19, 1957

2,786,035

PREPARATION OF CATALYST

Louis R. Freimiller, Philadelphia, and Charles H. McKeever, Meadowbrook, Pa., assignors to Rohm & Haas Company, Philadelphia, Pa., a corporation of Delaware No Drawing. Application September 22, 1955, Serial No. 536,031

3 Claims. (Cl. 252—429)

This invention relates to a process for the preparation of promoted or activated aluminum alkyls which are extremely effective as initiators for polymerizing olefins. The process comprises reacting aluminum ethyl sesquibromide and lead tetraethyl under anhydrous conditions and under an inert atmosphere and distilling the reaction product from the reaction mixture.

It is known that when ethyl bromide is heated with aluminum metal, there is formed the so-called aluminum ethyl sesquibromide (cf. Grosse and Mavity, J. Org. Chem. 5, 106). The product appears actually to be a mixture of $AlC_2H_5Br_2$ and $Al(C_2H_5)_2Br$, but no satisfactory method has been found for separating these substances. Separation, however, is not necessary for purposes of this invention. The product obtained by reacting ethyl bromide and aluminum in a dry, inert atmosphere is used directly and for convenience is here termed aluminum ethyl sesquibromide.

This sesquibromide is mixed in molecular excess with lead tetraethyl and the mixture is heated between 125° and 175° C., preferably 130° to 160° C. under anhydrous conditions and under an inert atmosphere. Heating serves to complete the reaction and to ensure that there is no free lead tetraethyl present by thermally decomposing it. This may require from three hours to a quarter hour, depending upon the temperature used and other conditions such as the excess of the sesquibromide used. The reaction mixture is then distilled, best under reduced pressure. Pressures below 20 mm. are advantageous, the range of 20 mm. to 0.2 mm. being practical. The distillate as obtained is highly effective for polymerizing olefins. If desired, it may be fractionally distilled and the most active fractions used for this purpose.

The mole ratio of aluminum ethyl sesquibromide to lead tetraethyl mixed for reaction is usually from 1.05:1 to 2:1, and preferably from 1.1:1 to 1.6:1.

If distillation is performed in the usual range of atmospheric pressures, it is carried on at 190° to 205° C. At a pressure of about 20 mm. of mercury temperatures of distillation between 95° and 110° C. are found, while at about 10 mm. temperatures of distillation fall between 85° and 100° C. At lower pressures temperatures of distillation will, of course, be still lower.

A typical preparation of the aluminum alkyls of this invention follows:

(a) A mixture of 65.4 parts by weight of ethyl bromide, 21.6 parts by weight of aluminum turnings, and a crystal of iodine was stirred under a dry nitrogen atmosphere for five hours and heated at 55° to 60° C. for a half hour. The mixture was cooled and distilled under low pressure. The main fraction was taken at 69° to 77° C./0.4 mm. A residue of 16 parts remained containing 13 parts of aluminum metal. The main distillate was the sesquibromide, a mixture of $AlC_2H_5Br_2$ and $Al(C_2H_5)_2Br$, in an amount of 58 parts by weight. There was recovered in a trap chilled with carbon dioxide six parts of ethyl bromide.

(b) The main fraction of 58 parts of the above sesquibromide was placed in a reaction vessel under an atmosphere of dry nitrogen and the flow of dry nitrogen was continued throughout the rest of the procedure. Thereto was slowly added 64.6 parts of lead tetraethyl with constant stirring. Heat of reaction raised the temperature of the reaction mixture to 70° C. The mixture was heated to about 150° C. for an hour, cooled, and distilled under reduced pressure at 40°–68° C./0.3–0.8 mm. The distillate amounted to 87 parts by weight. The residue amounted to 25 parts. This distillate was fractionally distilled, a fraction of 8.5 parts being taken at 33° to 35° C./0.35 mm. of 21.0 parts at 35° to 40° C./0.35 mm., of 7.0 parts at 40° to 45° C./0.35 to .38 mm., and of 44 parts at 50° to 57° C./0.35 mm., leaving a residue of three parts.

The fourth fraction was used for the polymerization of propylene, from which the chief product was dimer. The catalyst was recovered and reused. The catalyst is also highly active for polymerizing other olefins including ethylene, butylene, octene, dodecene, etc.

The product obtained is an activated aluminum alkyl which contains some lead and some bromine in combined form. The amounts of these will not exceed about 5% in the first crude distillate and will be between 0.01% and 2% in the redistilled fractions, varying somewhat with the particular fraction. The distillates thereof ignite spontaneously when exposed to air. They are exceptionally effective for polymerizing olefinic hydrocarbons, providing a higher degree of polymerization than the normal aluminum alkyls.

It is not possible to state the exact composition of the products prepared in this way. It is significant, however, that they all contain small amounts of lead and of bromine in combined form. It is evident that the products are complexes of aluminum alkyl and a metal bromide which serves as an activator or promoter. It is evident that the presence of the activating material makes these products different from the usual aluminum alkyls, since the products tend to give higher polymers than the dimers which are said to be the chief polymers formed in the presence of the latter.

While lead tetraethyl has been used above, particularly as a matter of convenience since it is commercially available, other lead tetraalkyls can be used in similar manner to give corresponding aluminum alkyls of good catalytic activity.

This application is a continuation-in-part of our application Serial No. 454,191, filed September 3, 1954, now abandoned.

We claim:

1. A process for preparing an activated aluminum alkyl initiator for polymerizing olefins which comprises mixing and reacting together under anhydrous conditions and under an inert atmosphere aluminum ethyl sesquibromide and lead tetraethyl in a mole ratio from 1.05:1 to 2:1, heating the reaction mixture to a temperature between 125° and 175° C. to carry the reaction toward completion and to decompose any remaining lead tetraethyl, and distilling off the reaction product under a reduced pressure.

2. The product of the process of claim 1, characterized in that it is an activated catalyst for polymerizing olefins and contains in chemical combination aluminum triethyl and small amounts of lead and bromine.

3. A process for preparing an activated aluminum alkyl initiator for polymerizing olefins which comprises mixing and reacting together under anhydrous conditions and under an inert atmosphere aluminum ethyl sesquibromide and lead tetraethyl in a mole ratio from 1.1:1 to 1.6:1, heating the reaction mixture between 130° and 160° C. for a time between about three hours and a quarter hour and until any free lead tetraethyl is decomposed, and distilling off the reaction product under a reduced pressure between 20 mm. and 0.2 mm.

References Cited in the file of this patent

UNITED STATES PATENTS

| 2,388,428 | Mavity | Nov. 6, 1945 |
| 2,447,926 | Wiczer | Aug. 24, 1948 |